A. J. SILVA.
AUTOMOBILE THEFT SIGNAL.
APPLICATION FILED AUG. 31, 1917.
1,307,933.
Patented June 24, 1919.
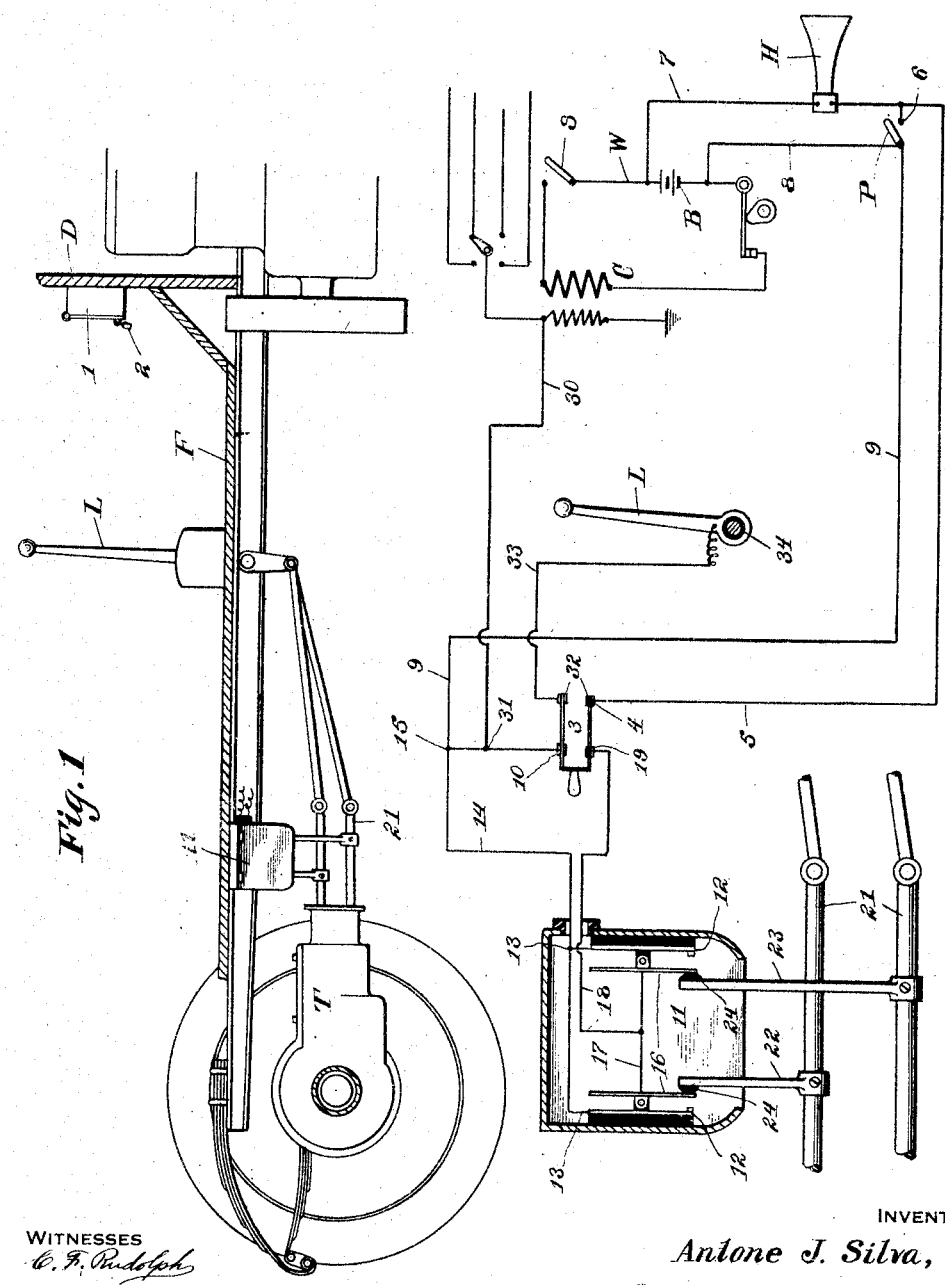
INVENTOR
Antone J. Silva,
BY Victor J. Evans
ATTORNEY
WITNESSES

UNITED STATES PATENT OFFICE.

ANTONE J. SILVA, OF SANTA MARIA, CALIFORNIA.

AUTOMOBILE-THEFT SIGNAL.

1,307,933.                Specification of Letters Patent.    Patented June 24, 1919.

Application filed August 31, 1917. Serial No. 189,191.

*To all whom it may concern:*

Be it known that I, ANTONE J. SILVA, a citizen of the United States, residing at Santa Maria, in the county of Santa Barbara and State of California, have invented new and useful Improvements in Automobile-Theft Signals, of which the following is a specification.

This invention relates to electric signals, and more especially to burglar alarms intended for application to an automobile as a protection thereof.

The broad purpose of the invention is to produce an alarm which is actuated by the movement of the gear shifting rods to set the transmission in any position except neutral, and which when actuated starts the continuous sounding of the horn and switches the secondary circuit onto the gear shifting lever so as to shock the would-be thief.

This object is carried out by means of specific details of construction hereinafter more fully described and claimed, and as shown in the drawings wherein:—

Figure 1 is a vertical longitudinal section through the floor and a portion of the dash of an automobile, showing this attachment as applied to the gear-shifting rods of the transmission, the latter being indicated broadly by the reference letter T and the lever L standing in this view as neutral.

Fig. 2 is a diagram showing the wiring, and this view includes a diagrammatic section of the circuit closer.

In the drawings the letter T designates the transmission and L the lever therefor as suggested above, F is the floor of the automobile and D its dash, H is the horn or other electrically actuated alarm, and C is the coil containing the primary and secondary windings as usual. The letter B designates a battery or other source of electrical energy, and W is a wire leading therefrom through an ignition switch S and the primary winding of the coil C. The secondary winding thereof is connected through the timer to the plugs as will be understood. Such is the construction and wiring of almost any present-day automobile having the Splitdorff ignition system, and further details in this respect are unnecessary.

Coming now to the present invention, the numeral 1 designates a box 1 on the dash D, having a cover which may be closed and locked as at 2, and within this is disposed a two-arm switch 3 as seen diagrammatically in Fig. 2. From the pivot 4 of one blade a wire 5 leads to the point 6 where it is connected to one side 7 of the horn-circuit which in turn is connected with one side of the battery B. The other side 8 of said horn circuit, connected with the other side of the battery, is adapted to be closed onto the side 7 by a push button indicated at P, so that the driver may sound the horn manually when he desires; but as this push button normally stands open, we may consider the wires 7 and 8 as parts of the horn circuit which includes the battery B as its source of energy, and this horn circuit may be said to be bridged by the pushbutton P. Beyond the latter the wire 8 extends as at 9, back to the contact point 10 for the other blade of the two-arm switch 3.

The circuit closer shown at the left of Fig. 2 and in elevation in Fig. 1 is broadly designated by the numeral 11. It contains two plates 12 connected as at 13 to a branch wire 14 which leads to and joins with the wire 9 at the point 15, and adjacent said plates are two others numbered 16 which are connected as at 17 with a wire 18 leading to a contact point 19 on the first-named blade of the switch 3. Thus is produced a mechanical circuit closer for the horn circuit, because if either plate 16 is thrown into contact with its companion plate 12, the wires 14 and 18 are closed through the switch 3 on to the wires 9 and 5 which control the horn in the manner above described.

The gear-shifting rods 21 of the transmission mechanism T carry upstanding fingers 22 and 23 which rise through the open lower end of the casing of the circuit closer 11 and are provided with insulation as indicated at 24 on their opposite and outer faces. Now when the lever L is moved to other positions than neutral, one of these rods is moved and its finger moves with it. But when the lever stands as neutral, as seen in Fig. 1, the plates within the circuit closer are not in electrical contact, and no current flows. All this mechanism is mounted beneath the floor F of the automobile and out of sight, excepting the box 1 which may well be on the dash within easy reach so that the operator can open its cover and open the switch therein when he is to drive the car, but can close the switch and then lock the cover closed when he leaves the car.

From the secondary winding of the coil C a wire 30 leads to and is connected with the wire 9 at the point 31, so that in effect it is connected with the contact point 10 of the switch 3. From the pivot 32 of that blade of the switch a wire 33 leads to the lever L, and the latter is insulated as indicated at 34. Therefore whenever any one grasps this lever while the switch is closed and the engine is running, his body short circuits the lever to ground (which latter is the frame of the machine) and he necessarily receives a shock through his hand and arm.

With this construction, the operation of my device is as follows:—Assuming that the operator has left the car with the alarm set. When now an unauthorized person approaches and seeks to make way with the automobile, he will hardly know that there is a burglar or theft-alarm provided because all parts of the same are out of sight excepting the closed and locked box and he has no way of knowing what that contains. He will first close the switch S and crank the engine, and now of course current flows through the coil C. Getting into the car, he moves the lever L to some other position than neutral—it matters not which. Such movement slides one of the rods 21, and its finger closes a circuit with the results which will now be described in detail. Immediately he places his hand on the lever L, he receives a strong shock because in doing so he short-circuits the secondary winding of the coil C as above described. But supposing he withstands this shock and throws the lever. Such action closes one plate 16 against its companion plate 12, and the horn H or other alarm begins to sound. Even if he should not remove his hand from the lever, the horn continues to sound so long as the parts of the transmission mechanism T stand in other position than neutral, and therefore if he should now close the clutch and start away with the machine, the horn would yet be sounding. Quite naturally he would be apt to touch the button P, or move it if it be a switch, in his efforts to cut off the horn; and in desperation he moves the lever back to neutral. But as each time he touches the lever L he secures a shock his natural impulse will be to move the switch S and cut off the current to avoid this shock, and that act stops the engine. None of these difficulties would have arisen if the switch 3 had been opened, and therefore when the owner returns to his machine his first act is to unlock the box 1 and open the switch, after which he can start his machine as usual. Thus it will be seen that this theft signal is controlled entirely by the switch 3, and while I have spoken of it as being contained within a locked box, any appropriate type of locked switch may be employed. The invention is susceptible of modification to the extent that the wire 33 to an insulated lever L might be omitted, but in that case no shock would be given the would-be thief although the horn would sound whenever he set the lever at other than a neutral position.

What is claimed as new is:—

A circuit closer for theft signals for automobiles, comprising a casing arranged adjacent to the gear shifting rods of the automobile, spaced plates arranged therein and each connected to the same circuit conductor, plates pivotally mounted in spaced relation to the first-mentioned plates and each connected to the other circuit conductor, gear shifting rods and a member connected to each gear shifting rod and arranged adjacent one of the pivoted plates beyond the pivot thereof, whereby in the movement of either rod a plate is moved to complete a circuit.

In testimony whereof I affix my signature.

ANTONE J. SILVA.